(12) United States Patent
Sung et al.

(10) Patent No.: US 10,818,183 B2
(45) Date of Patent: Oct. 27, 2020

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: DongHyun Sung, Hwaseong-si (KR); Yongseok Kwon, Suwon-si (KR); Jonghyeok Park, Seosan-si (KR); Tae Young Lee, Yongin-si (KR); Junghyun Kim, Seoul (KR); Eungseo Kim, Suwon-si (KR); Sangmin Lee, Seoul (KR)

(73) Assignees: HYUNDAI MOTOR COMPANY, Seoul (KR); KIA MOTORS COMPANY, Seoul (KR)

( * ) Notice: Subject to any disclaimer, the term of this patent is extended or adjusted under 35 U.S.C. 154(b) by 55 days.

(21) Appl. No.: 16/022,117

(22) Filed: Jun. 28, 2018

(65) Prior Publication Data
US 2019/0259283 A1    Aug. 22, 2019

(30) Foreign Application Priority Data
Feb. 21, 2018 (KR) .................. 10-2018-0020386

(51) Int. Cl.
*G08G 1/16* (2006.01)
*G06K 9/00* (2006.01)
(Continued)

(52) U.S. Cl.
CPC ............. *G08G 1/166* (2013.01); *B60Q 5/006* (2013.01); *B60T 7/22* (2013.01); *G01S 13/867* (2013.01);
(Continued)

(58) Field of Classification Search
CPC ........ G08G 1/166; G08G 1/163; G08G 1/052; G08G 1/04; G08G 1/096725; G08G 1/161;
(Continued)

(56) References Cited

U.S. PATENT DOCUMENTS

2006/0187009 A1* 8/2006 Kropinski ............. G01S 15/931
340/435
2014/0132770 A1 5/2014 Lee et al.
(Continued)

FOREIGN PATENT DOCUMENTS

JP          2008-293099      12/2008
KR     20-2012-003406 U      5/2012
(Continued)

*Primary Examiner* — Kimberly S Berona
*Assistant Examiner* — Michael V Kerrigan
(74) *Attorney, Agent, or Firm* — Brinks Gilson & Lione

(57) ABSTRACT

The present disclosure relate to a technology to detect an object placed in a blind spot on a road so as to inhibit collision between a target vehicle driving in the vicinity of a vehicle, and the object. The vehicle includes an imager to detect the object by recording the object near the vehicle, a sensor to obtain position information and speed information of the object, and a controller to calculate a time to collision (TTC) between the target vehicle and the object, based on the position information and/or speed information of the object. to the controller outputs a collision risk warning signal in a direction of the object, based on the calculated TTC.

19 Claims, 12 Drawing Sheets

(51) Int. Cl.
*G08G 1/04* (2006.01)
*G08G 1/052* (2006.01)
*B60T 7/22* (2006.01)
*B60Q 5/00* (2006.01)
*G01S 13/86* (2006.01)
*G01S 13/931* (2020.01)

(52) U.S. Cl.
CPC ........ *G01S 13/931* (2013.01); *G06K 9/00805* (2013.01); *G08G 1/04* (2013.01); *G08G 1/052* (2013.01); *G08G 1/163* (2013.01); *G01S 2013/9323* (2020.01)

(58) Field of Classification Search
CPC ............... G01S 13/931; G01S 13/867; G01S 2013/9367; G01S 2013/93274; G01S 2013/93272; G01S 2013/93271; G01S 2013/9316; G01S 15/931; G01S 17/931; G01S 13/52; G01S 13/42; G01S 2013/93275; G01S 7/003; G01S 13/87; G01S 2013/9323; B60Q 5/006; B60Q 2300/45; B60Q 1/085; B60Q 1/46; B60Q 9/008; B60Q 1/525; G06K 9/00805; B60T 7/22; B60T 2201/022; B60T 2201/024; B60W 2554/00; B60W 2554/80; B60W 30/0956; B60W 30/08
See application file for complete search history.

(56) References Cited

U.S. PATENT DOCUMENTS

| | | | |
|---|---|---|---|
| 2016/0121791 A1* | 5/2016 | Shimizu | B60Q 1/525 340/435 |
| 2017/0120907 A1* | 5/2017 | Wolf | G08G 1/16 |
| 2018/0151077 A1* | 5/2018 | Lee | G08G 1/162 |

FOREIGN PATENT DOCUMENTS

| | | |
|---|---|---|
| KR | 10-2013-0119593 A | 11/2013 |
| KR | 10-1350306 B1 | 1/2014 |
| KR | 10-2016-0040911 A | 4/2016 |
| KR | 10-2016-0134016 | 11/2016 |
| KR | 10-2017-0049252 | 5/2017 |
| KR | 10-2018-0065585 | 6/2018 |
| KR | 10-2018-0066524 | 6/2018 |

* cited by examiner

VEHICLE AND METHOD FOR CONTROLLING THEREOF

CROSS-REFERENCE TO RELATED APPLICATION

This application claims priority to and the benefit of Korean Patent Application No. 10-2018-0020386, filed on Feb. 21, 2018, the entire contents of which are incorporated by reference.

FIELD

The present disclosure relate to a vehicle and a method for controlling thereof, more particularly, to a technology to inhibit collision between a vehicle and an object on a road.

BACKGROUND

The statements in this section merely provide background information related to the present disclosure and may not constitute prior art.

A vehicle represents a variety of apparatuses configured to transport an object, such as people and goods, to a destination. The vehicle may be capable of moving in a variety of direction by using one and more wheels installed in a body of the vehicle. The vehicle may include a three-wheeled or four-wheeled vehicle, a two-wheeled vehicle, such as a motorcycle, construction equipment, a cycle or a train traveling on the rails disposed on the line.

In modern society, the vehicle has been the most common means of transportation, and the number of people using them has been increased. Due to the development of vehicle technology, there are also advantages, such as ease movement in the long distance and ease of life. However, the traffic congestion has been getting worse due to the deterioration of the road traffic in a high density area, e.g., South Korea.

In recent years, a research has been actively carried out for a vehicle equipped with an Advanced Driver Assist System (ADAS) that actively provides information about the vehicle condition, the driver condition, and the surrounding environment in order to reduce the burden on the driver and improve the convenience.

An example of advanced driver assistance systems that are implemented in the vehicle includes a Forward Collision Avoidance (FCA), and Autonomous Emergency Brake (AEB). The system may be operated by determining a risk of collision with a counter vehicle or a crossing vehicle and by performing an emergency braking in a collision situation, when the vehicle drives in the intersection.

We have discovered that when a pedestrian walking on a road is blocked by a parked vehicle, a stopped vehicle or by a structure in the vicinity of the road, it may be difficult for other vehicle driving on the road to see the pedestrian, and thus it may be difficult to immediately avoid the collision with the pedestrian

SUMMARY

The present disclosure provides a vehicle, in a parked state or stopped state, capable of inhibiting a collision with other vehicle in a driving state or an object, by directly warning about the object or by transmitting a signal to the other vehicle driving in the vicinity of the vehicle when an object is detected in a blind spot of the vehicle on a road. The present disclosure also provides a method for controlling a vehicle to avoid such a collision in the above situation.

Additional aspects of the present disclosure will be set forth in part in the description which follows and, in part, will be obvious from the description, or may be learned by practice of the present disclosure.

In accordance with one aspect of the present disclosure, a vehicle includes: an imager configured to detect an object by recording the object in the vicinity of the vehicle; a sensor configured to obtain at least one of position information or speed information of the object; and a controller configured to calculate a time to collision (TTC) between a target vehicle driving in the vicinity of the vehicle and the object, based on the obtained position information and/or speed information of the object, and configured to output a collision risk warning signal in a direction of the object, based on the calculated TTC.

Based on the calculated TTC, the controller may transmit a signal controlling a driving speed of the target vehicle.

Based on the calculated TTC, the controller may transmit a braking control signal allowing the target vehicle to avoid a collision with the object.

Based on the calculated TTC, the controller may transmit a control signal warning a driver of the target vehicle of the collision risk between the target vehicle and the object.

The sensor may obtain at least one of position information or speed information of the target vehicle driving in the vicinity of the vehicle.

The vehicle may be in a parked state or a stopped state.

The controller may generate the collision risk warning signal that is configured to cause a headlamp of the vehicle to emit light in the direction of the object.

The controller may generate the collision risk warning signal that is configured to cause a speaker of the vehicle to output a sound signal regarding the target vehicle in the direction of the object.

The controller may generate the collision risk warning signal that is configured to operate a turn signal lamp of the vehicle such that a driver of the target vehicle is warned of the collision risk between the object and the target vehicle.

The vehicle may further include a communicator configured to transmit the collision risk warning signal to the target vehicle.

The sensor may include one of a Radar and a LiDAR.

In another form of the present disclosure, a method for controlling a vehicle include: detecting, by an imager, an object by recording the object in the vicinity of the vehicle; obtaining, by a sensor, at least one of position information or speed information of the object; calculating, by a controller, a time to collision (TTC) between a target vehicle driving in the vicinity of the vehicle and the object, based on the obtained position information and/or speed information of the object; and transmitting, by the controller, a collision risk warning signal in a direction of the object, based on the calculated TTC.

The method may further include: transmitting, by the controller, a signal controlling a driving speed of the target vehicle, based on the calculated TTC.

The method may further include: transmitting, by the controller, a braking control signal to the target vehicle to avoid a collision with the object, based on the calculated TTC.

The method may further include: transmitting, by the controller, a control signal to warn a driver of the target vehicle of the collision risk between the target vehicle and the object, based on the calculated TTC.

The method may further include: obtaining, by the sensor, at least one of position information or speed information of the target vehicle driving in the vicinity of the vehicle.

The collision risk warning signal may include a control signal warning of the collision risk, and the control signal is configured to cause a headlamp of the vehicle to emit light in the direction of the object.

The collision risk warning signal may include a control signal warning of the collision risk, and the control signal is configured to output a sound signal of the vehicle in the direction of the object.

The collision risk warning signal may include a control signal to warn a driver of the target vehicle of the collision risk between the object and the target vehicle, and the control signal is configured to operate a turn signal lamp of the vehicle.

The method may further include: transmitting the collision risk warning signal to the target vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 10:
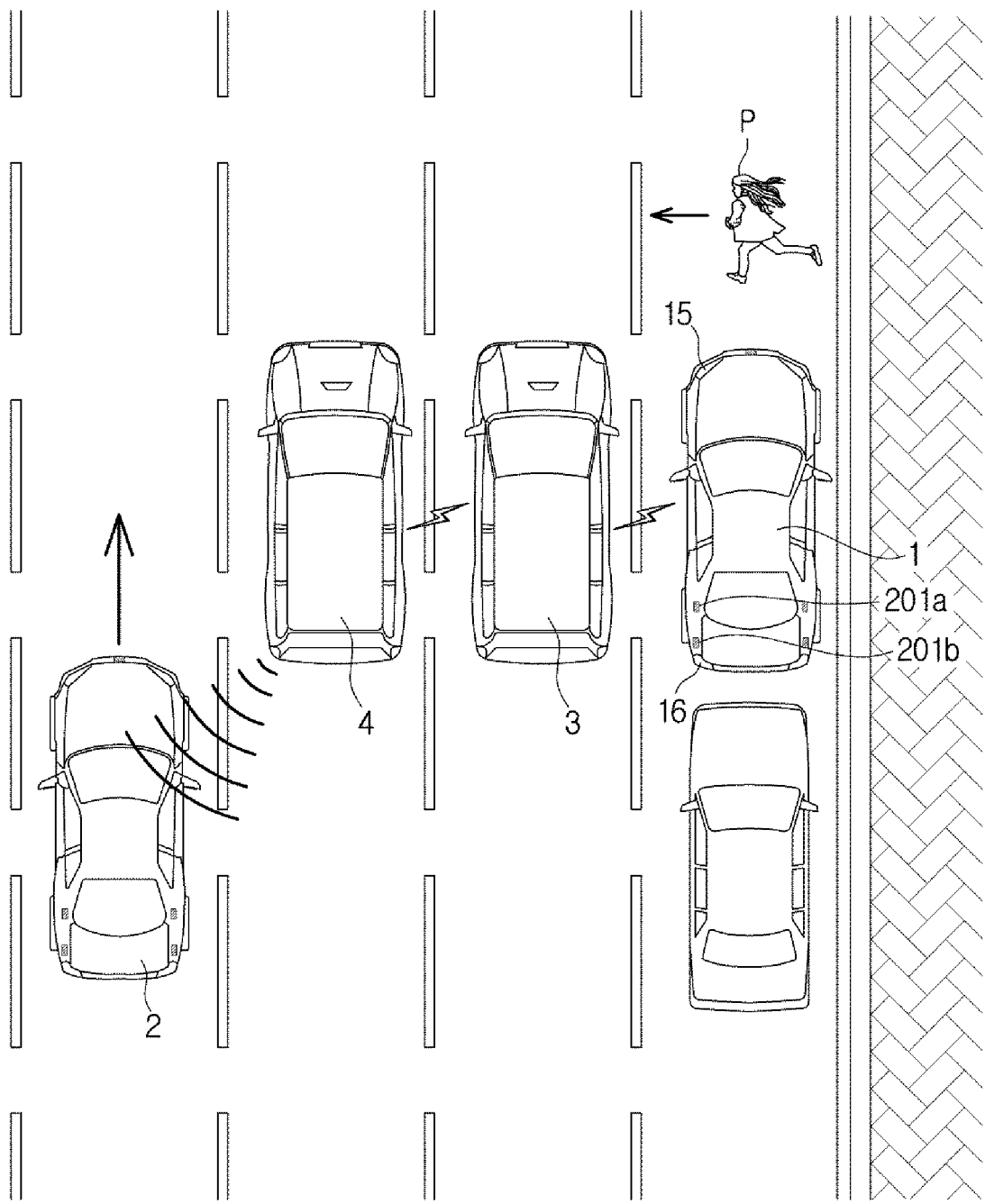
Figure 11:
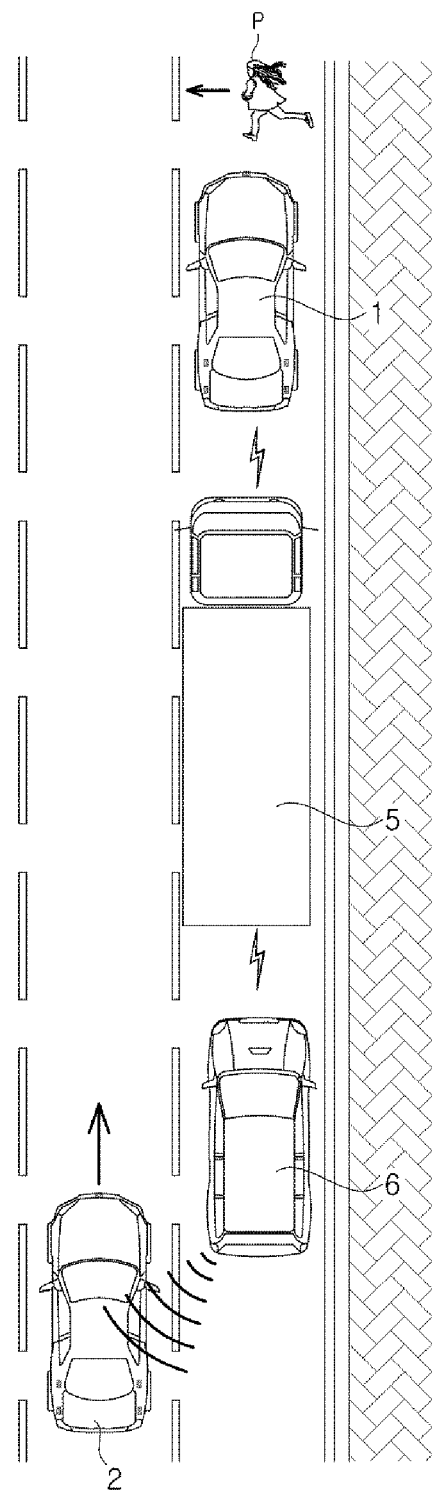
Figure 12:
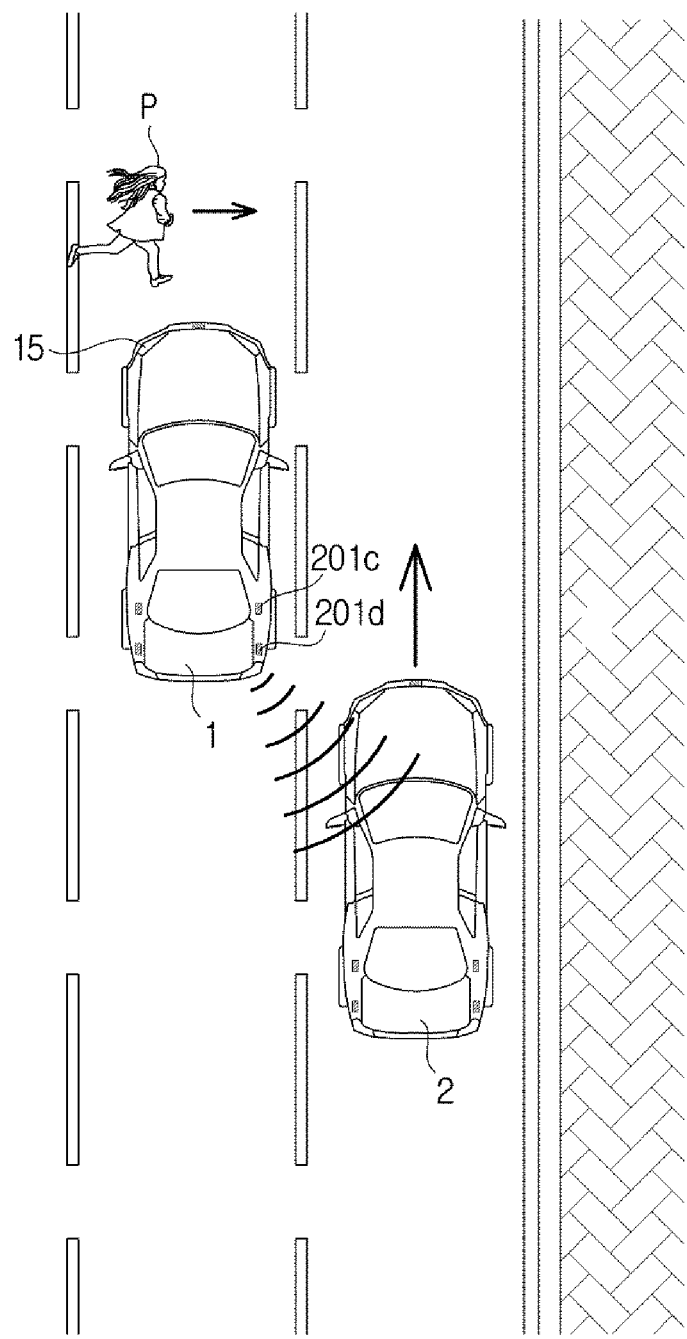

FIGS. 10 to 11 are views illustrating a method for controlling a vehicle for inhibiting a collision between an object and other vehicle driving in the vicinity of the vehicle by using a communication between a parked or stopped vehicle and a plurality of other vehicles; and FIG. 12 is a view illustrating a method for controlling a vehicle for inhibiting a collision between an object that is detected by a parked or stopped vehicle and other vehicle driving in the vicinity of the vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, well-known functions or constructions are not described in detail since they would obscure the one or more exemplar forms with unnecessary detail. Terms such as "unit", "module", "member", and "block" may be embodied as hardware or software. According to forms, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to forms of the present disclosure, examples of which are illustrated in the accompanying drawings.

Figure 1:
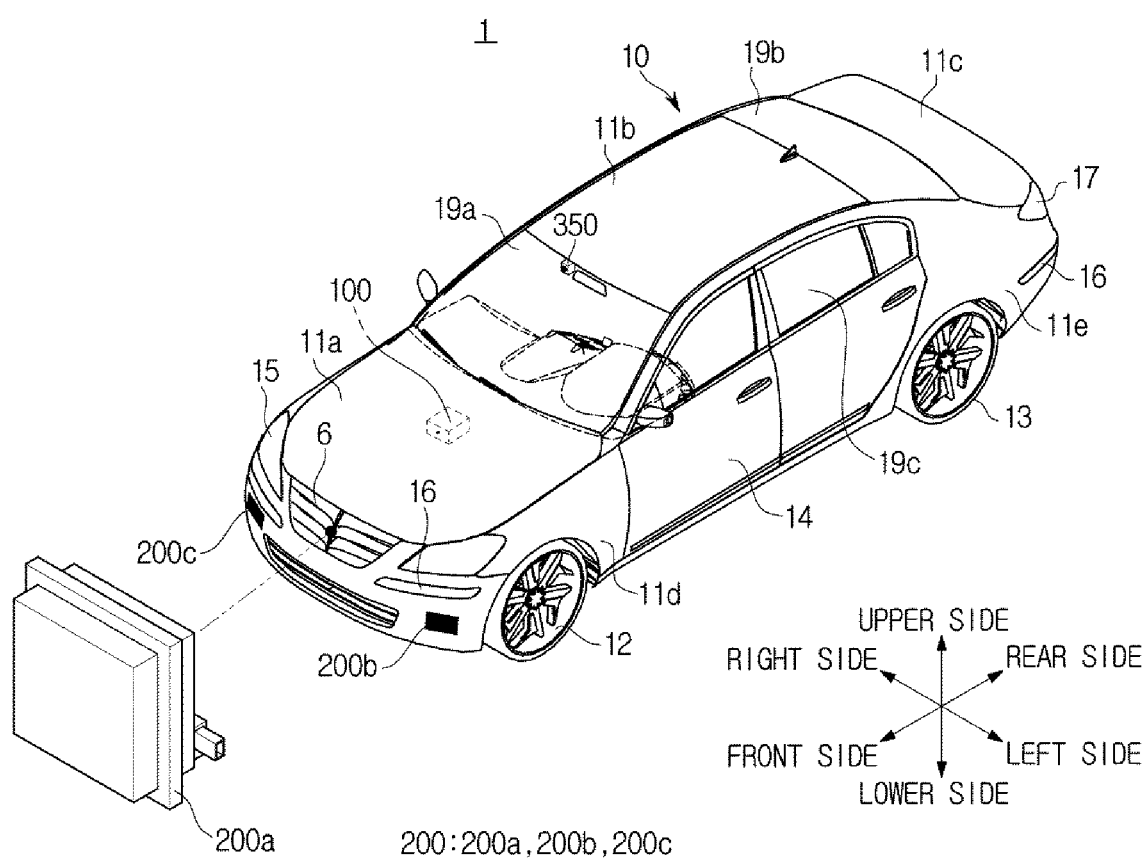
FIG. 1 is a perspective view schematically illustrating an appearance of a vehicle.
Figure 2:
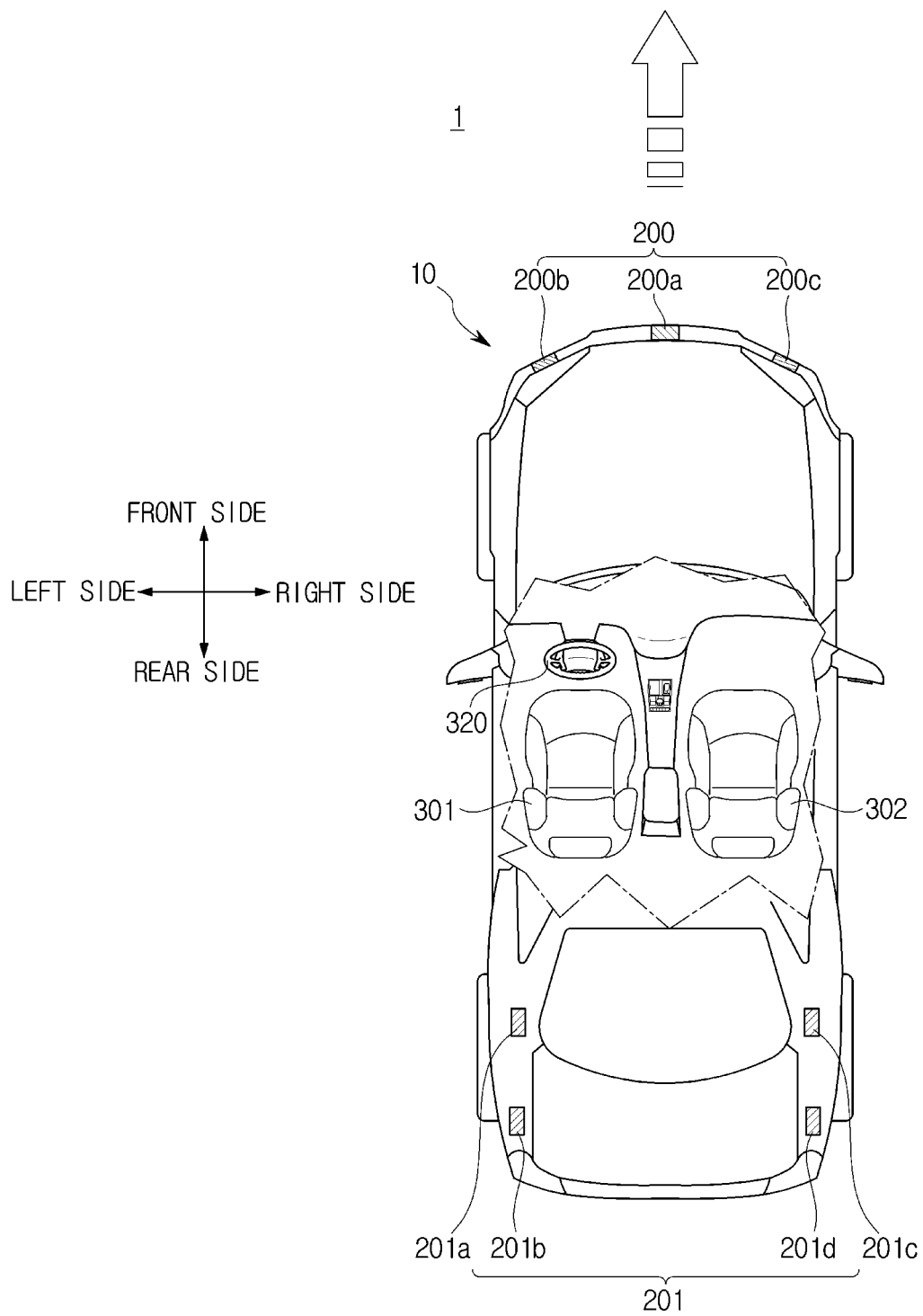
FIG. 2 is a view illustrating the vehicle provided with a sensor and a rear lateral side sensor.
Figure 3:
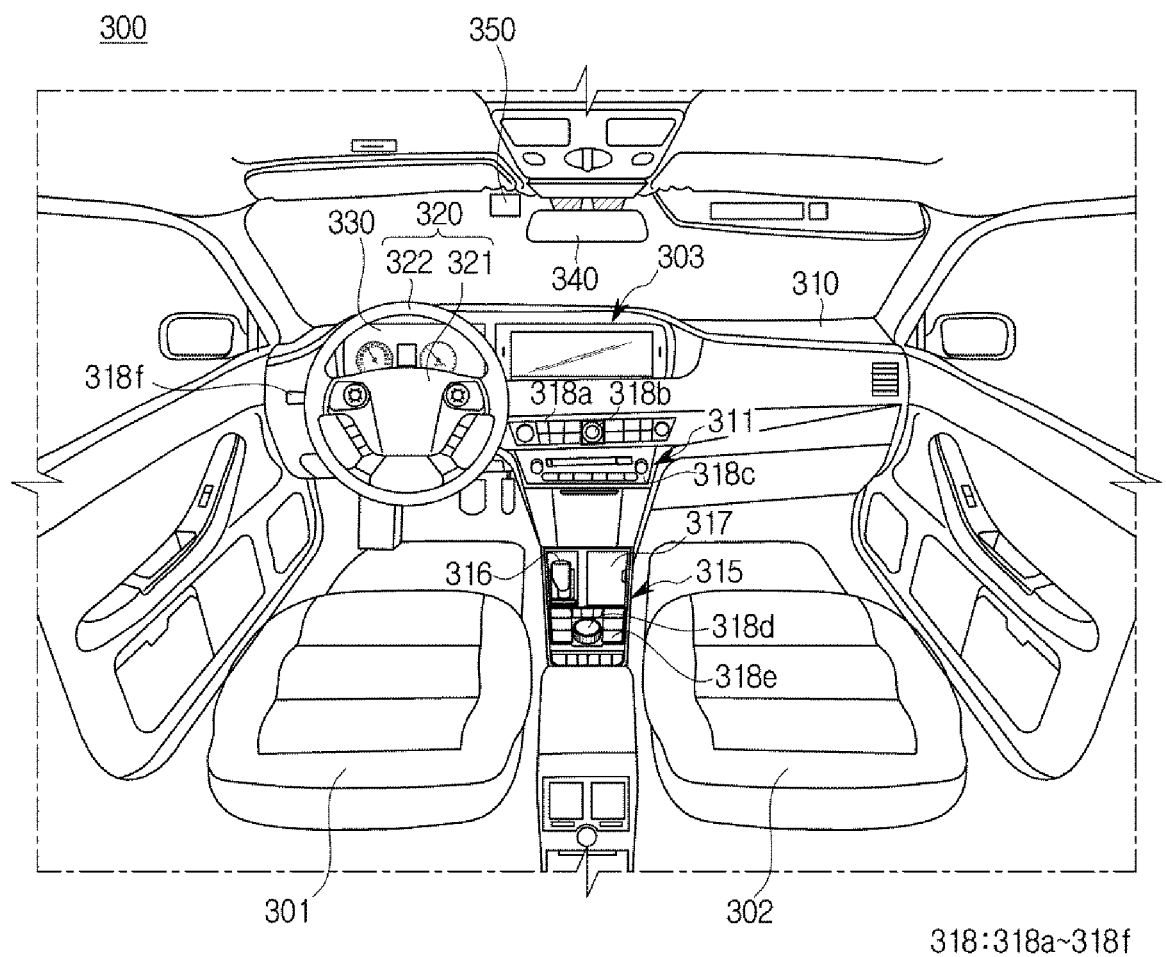
FIG. 3 is a view illustrating an interior structure of the vehicle.
Figure 4:
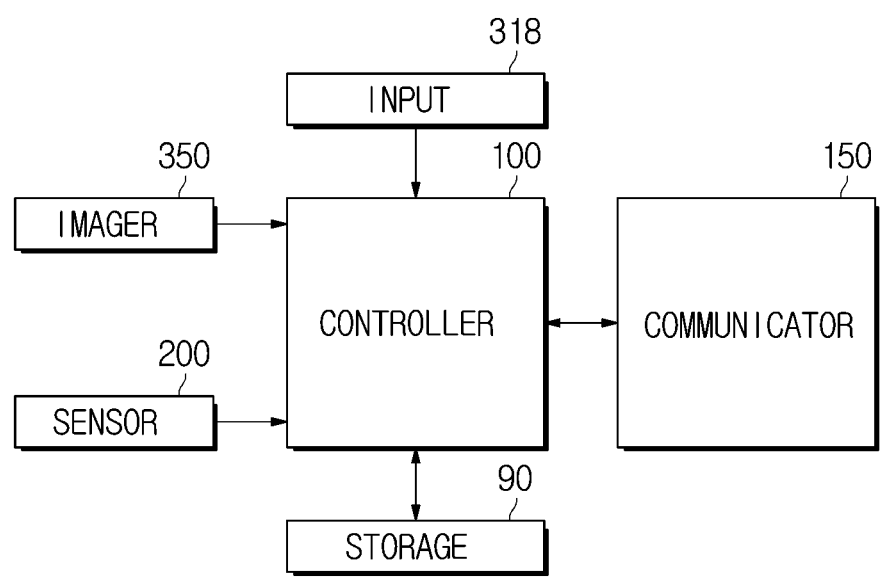
FIG. 4 is a control block diagram of the vehicle.

FIG. 1 is a perspective view schematically illustrating an appearance of a vehicle in one form. FIG. 2 is a view illustrating the vehicle provided with a sensor and a rear lateral side sensor in one form, FIG. 3 is a view illustrating an interior structure of the vehicle in one form, and FIG. 4 is a control block diagram of the vehicle in one form of the present disclosure.

Hereinafter for convenience of description, as illustrated in FIG. 1, a direction in which a vehicle moves forward may be defined as the front side, and the left direction and the right direction may be defined with respect to the front side. When the front side is a 12 o'clock direction, a 3 o'clock direction or its periphery may be defined as the right direction and a 9 o'clock direction or its periphery may be defined as the left direction. A direction opposite to the front side may be defined as the rear side. A bottom direction with respect to the vehicle 1 may be defined as the lower side and a direction opposite to the lower side may be defined as the upper side. A surface disposed in the front side may be defined as a front surface, a surface disposed in the rear side may be defined as a rear surface, and a surface disposed in the lateral side may be defined as a side surface. A side surface in the left direction may be defined as a left surface and a side surface in the right direction may be defined as a right surface.

Referring to FIG. 1, the vehicle 1 may include a body 10 forming an exterior of the vehicle 1, and a vehicle wheel 12 and 13 moving the vehicle 1.

The body 10 may include a hood 11*a* protecting a variety of devices, which are needed to drive the vehicle 1, e.g., an engine, a roof panel 11*b* forming an inner space, a trunk lid 11*c* provided with a storage space, a front fender 11*d* and a quarter panel 11*e* provided on the side surface of the vehicle 1. In addition, a plurality of doors 14 hinge-coupled to the body 10 may be provided on the side surface of the body 10.

Between the hood 11*a* and the roof panel 11*b*, a front window 19*a* may be installed to provide a view of the front side of the vehicle 1, and between the roof panel 11*b* and the trunk lid 11c, a rear window 19b may be installed to provide a view of the rear side of the vehicle 1. In addition, on the upper side of the door 14, a side window 19c may be installed to provide a view of the lateral side.

On the front side of the vehicle 1, a headlamp 15 emitting light in a driving direction of the vehicle 1 may be provided.

On the front and rear side of the vehicle 1, a turn signal lamp 16 indicating a driving direction of the vehicle 1 may be provided.

The vehicle 1 may indicate a driving direction by flashing the turn signal lamp 16. The turn signal lamp 16 may be installed on the front and rear side of the vehicle 1. On the rear side of the vehicle 1, a tail lamp 17 may be provided. The tail lamp 17 may be provided on the rear side of the vehicle 1 to indicate a gear shifting state and a brake operating state of the vehicle 1.

As illustrated in FIGS. 1 and 3, at least one imager 350 may be provided inside the vehicle 1. While the vehicle 1 drives or while the vehicle 1 is stopped, the imager 350 may acquire a surrounding image of the vehicle 1, detect an object in the vicinity of the vehicle 1, and acquire information related to the type of the object and the position information of the object. The object obtained in the vicinity of the vehicle 1 may include other vehicle, a pedestrian, and a bicycle, and may include a moving object or a stationary obstacle.

The imager 350 may image the object around the vehicle 1 and obtain the shape of the object by identifying the imaged object through the image recognition, and the imager 350 may transmit the obtained information to the controller 100.

FIG. 3 illustrates that the imager 350 is disposed around a room mirror 340, but is not limited thereto. Therefore, the imager 350 may be disposed in any position as long as capable of acquiring image information by imaging the inside or the outside of the vehicle 1.

The imager 350 may include at least one camera, and the imager 350 may include a three-dimensional space recognition sensor, a radar sensor, or an ultrasonic sensor to acquire a more accurate image.

The three-dimensional space recognition sensor may include KINECT (RGB-D sensor), TOF (Structured Light Sensor), or stereo camera, but is not limited thereto. Therefore, the three-dimensional space recognition sensor may include other devices having the similar function as mentioned above.

Referring to FIGS. 1 and 2, a sensor 200 may be provided in the vehicle 1, wherein the sensor 200 is configured to identify an object in front of the vehicle 1 and acquire at least one piece of position information and driving speed information of the identified object.

According to the form, the sensor 200 may acquire at least one of position information and/or driving speed information of the object, wherein the object is placed in the vicinity of the vehicle 1 with respect to the vehicle 1. That is, the sensor 200 may obtain coordinate information, which is changed as the object moves, in real time, and identify a distance between the vehicle 1 and the object.

As mentioned above, the sensor 200 may calculate a relative distance and a relative speed between the vehicle 1 and the object based on the position and speed information of the object obtained by the sensor 200, and thus the sensor 200 may calculate a time to collision (TTC) between the vehicle 1 and the object based on the obtained relative distance and relative speed.

As illustrated in FIGS. 1 and 2, the sensor 200 may be installed in a position that is appropriate to recognize an object, e.g. other vehicle, in the front, lateral or front lateral side. In one form, the sensor 200 may be installed in all of the front, the left and the right side of the vehicle 1 to recognize an object in all of the front side of the vehicle 1, a direction between the left side and the front side (hereinafter referred to as "front left side") of the vehicle 1 and a direction between the right side and the front side (hereinafter referred to as "front right side") of the vehicle 1.

For example, a first sensor 200a may be installed as a part of a radiator grill 6, e.g., inside of the radiator grill 6, or alternatively the first sensor 200a may be installed in any position of the vehicle 1 as long as identifying other vehicle in the front side. A second sensor 200b may be installed in the left side of the vehicle 1, and a third sensor 200c may be installed in the right side of the vehicle 1.

The sensor 200 may identify whether other vehicle is present in or approaching from the left side, the right side, the front side, the rear side, the front left side, the front right side, the rear left side, or the rear right side, by using electromagnetic waves or laser light.

That is, the sensor 200 may detect another vehicle driving on a right side lane of a lane where the vehicle 1 is driving. For example, when other vehicle drives on a right side lane of a lane where the vehicle 1 drives that is when other vehicle is placed in the front right side of the vehicle 1, the third sensor 200c may detect other vehicle driving in the front right side of the vehicle 1. The third sensor 200c may detect other vehicle driving in the front right side of the vehicle 1 and then obtain coordinate information and driving speed information of the other vehicle.

In the same manner as mentioned above, the sensor 200 may detect other vehicle driving on a left side lane of a lane where the vehicle 1 is driving. For example, when other vehicle drives on a left side lane of a lane where the vehicle 1 drives that is when other vehicle is placed in the front left side of the vehicle 1, the second sensor 200b may detect other vehicle driving in the front left side of the vehicle 1. The second sensor 200b may detect other vehicle driving in the front left side of the vehicle 1 and then obtain coordinate information and driving speed information of the other vehicle.

The sensor 200 may include a rear lateral side sensor 201 configured to detect a pedestrian or other vehicle that is present in or approaching from the rear side, lateral side or a direction between the lateral side and the rear side (hereinafter referred to as a rear lateral side).

As illustrated in FIG. 2, the rear lateral side sensor 201 may be installed in a position that is appropriate to recognize an object, e.g. other vehicle, in the lateral side, rear side or rear lateral side.

In this form, the rear lateral side sensor 201 may be installed in both of the left and the right side of the vehicle 1 to recognize an object in all of a direction between the left side and the rear side (hereinafter referred to as "rear left side") of the vehicle 1 and a direction between the right side and the rear side (hereinafter referred to as "rear right side") of the vehicle 1. For example, a first rear lateral side sensor 201a or a second rear lateral side sensor 201b may be provided on the left surface of the vehicle 1, and a third rear lateral side sensor 201c or a fourth rear lateral side sensor 201d may be provided on the right surface of the vehicle 1.

In another form, the rear lateral side sensor 201 may be installed in a plurality of positions to properly recognize a vehicle. For example, the first rear lateral side sensor 201a and the second rear lateral side sensor 201b may be installed in a left C pillar and a left rear fender of the vehicle 1, respectively and thus the first rear lateral side sensor 201a and the second rear lateral side sensor 201*b* may identify whether a pedestrian or other vehicle is present or whether a pedestrian or other vehicle is approaching. In the same manner, the third rear lateral side sensor 201*c* and the fourth rear lateral side sensor 201*d* may be installed in a right C pillar and a right rear fender of the vehicle 1, respectively and thus the third rear lateral side sensor 201*c* and the fourth rear lateral side sensor 201*d* may identify whether another vehicle is present. The position of the rear lateral side sensor 201 is not limited thereto, and the rear lateral side sensor 201 may be installed in any position of the vehicle 1 according to the selection of a designer. For example, the rear lateral side sensor 201 may be installed in a position adjacent to the rear turn signal lamp 16.

The rear lateral side sensor 201 may detect other vehicle driving in the rear side of the right side lane of a lane where the vehicle 1 is driving. For example, when other vehicle drives in the right side lane of a lane where the vehicle 1 drives that is when other vehicle is placed in the rear right side of the vehicle 1, the third rear lateral side sensor 201*c* or the fourth rear lateral side sensor 201*d* may detect other vehicle driving in the rear right side of the vehicle 1. The third rear lateral side sensor 201*c* or the fourth rear lateral side sensor 201*d* may detect other vehicle driving in the rear right side of the vehicle 1 and then obtain coordinate information and driving speed information of the other vehicle.

In the same manner, the rear lateral side sensor 201 may detect other vehicle driving in the rear side of the left side lane of a lane where the vehicle 1 is driving. For example, when other vehicle drives in the left side lane of a lane where the vehicle 1 drives that is when other vehicle is placed in the rear left side of the vehicle 1, the first rear lateral side sensor 201*a* or the second rear lateral side sensor 201*b* may detect other vehicle driving in the rear left side of the vehicle 1. The first rear lateral side sensor 201*a* or the second rear lateral side sensor 201*b* may detect other vehicle driving in the rear left side of the vehicle 1 and then obtain coordinate information and driving speed information of the other vehicle.

The sensor 200 may identify whether other vehicle is present in or approaching from the left side, the right side, the front side, the rear side, the front left side, the front right side, the rear left side, or the rear right side, by using electromagnetic waves or laser light. For example, the sensor 200 may emit electromagnetic waves, e.g., microwaves or millimeter waves, pulsed laser light, ultrasonic waves, or infrared light, to the left side, the right side, the front side, the rear side, the front left side, the front right side, the rear left side, or the rear right side, receive pulsed laser light, ultrasonic waves, or infrared light, which are reflected or scatted by an object in the direction, and identify whether the object is placed. The sensor 200 may further identify a distance to the object or a speed of other vehicle in a driving state, by using a return time of the radiated electromagnetic waves, pulsed laser light, ultrasonic waves, or infrared light.

In one form, the sensor 200 may identify the presence of the object by receiving visible light that is reflected or scattered by the object in the left side, the right side, the front side, the rear side, the front left side, the front right side, the rear left side, or the rear right side. As mentioned above, a recognition distance to other vehicle placed in the front or rear side may vary depending on using which one of the electromagnetic waves, the pulsed laser light, the ultrasonic waves, the infrared light or the visible light. The weather or illumination may affect identifying the presence of the object.

By using this, when the vehicle 1 drives in a certain direction along a certain lane, the controller 100 of the vehicle 1 may identify whether other vehicle is present, wherein the other vehicle is placed in the left side, the right side, the front side, the rear side, the front left side, the front right side, the rear left side, or the rear right side of the vehicle 1 while the other vehicle drives on a different lane.

The sensor 200 may be implemented by using a variety of devices, e.g., a radar using millimeter waves or microwaves, a Light Detection And Ranging (LiDAR) using pulsed laser light, a vision sensor using visible light, an infrared sensor using infrared light, or an ultrasonic sensor using ultrasonic waves. The sensor 200 may be implemented by using any one of the radar, the Light Detection And Ranging (LiDAR), the vision sensor, the infrared sensor, or the ultrasonic sensor or by combining them. When a plurality of sensors 200 is provided in a single vehicle 1, each of the sensor 200 may be implemented by using the same type of sensor or the different type of sensor. The implementation of the sensor 200 is not limited thereto, and the sensor 200 may be implemented by using a variety of devices and a combination thereof which is considered by a designer.

Referring to FIG. 3, in the interior 300 of the vehicle, a driver seat 301, a passenger seat 302, a dashboard 310 and a steering wheel 320, and an instrument panel 330 may be provided.

The dashboard 310 may represent a panel configured to divide the inside of vehicle 1 into the interior of the vehicle 1 and an engine compartment, and in which a variety of components desired for the driving is installed. The dashboard 310 may be provided in the front side of the driver seat 301 and the passenger seat 302. The dashboard 310 may include an upper panel, a center fascia 311 and a gear box 315.

In the upper panel of the dashboard 310, the display 303 may be installed. The display 303 may provide a variety of information to a driver or a passenger of the vehicle 1, as an image. For example, the display 303 may visually provide a variety of information, e.g., a map, weather, news, a variety of moving images or still images, and a variety of information related to conditions or operation of the vehicle 1, e.g., information about an air conditioning device. Further, the display 303 may provide a warning according to the risk, to the driver or the passenger. Particularly, when the vehicle 1 changes its lane, the display 303 may provide a warning to the driver, which varies according to the risk. The display 303 may be implemented by using a navigation system that is commonly used.

The display 303 may be installed in a housing that is integrally formed with the dashboard 310 to allow a display panel to be exposed to the outside. The display 303 may be installed in the center portion or a lower end of the center fascia 311, an inner surface of a windshield (not shown), or an upper surface of the dashboard 310, wherein the display 303 may be installed in the upper surface of the dashboard 310 by using a supporter (not shown). Alternatively, the display 303 may be installed in a variety of positions by the designer.

In the dashboard 310, a variety of devices, e.g., a processor, a communication module, a GPS reception module, and a storage, may be installed. The processor installed in the vehicle 1 may be configured to control electronics installed in the vehicle 1, and as mentioned above, the processor may be provided to perform functions of the controller 100. The above mentioned devices may be implemented by using a variety of components, e.g., semiconductor chips, switches, integrated circuits, resistors, volatile or non-volatile memory or printed circuit boards.

The center fascia 311 may be provided in the center of the dashboard 310 and may be provided with an input 318a to 318c for inputting a variety of commands related to the vehicle. The input 318a to 318c may be implemented using a physical button, a knob, a touch pad, a touch screen, a stick-type operator or a track ball. The driver may control the various operations of the vehicle 1 by operating the input 318a to 318c.

The gear box 315 may be provided between the driver seat 301 and the passenger seat 302 in the lower end of the center fascia 311. In the gearbox 315, a gear 316, a console 317, and various inputs 318d 318e may be provided. The input 318d to 318e may be implemented using a physical button, a knob, a touch pad, a touch screen, a stick-type operator or a track ball. The console 317 and the input 318d to 318e may be omitted.

The steering wheel 320 and the instrument panel 330 may be provided in the direction of the driver seat in the dashboard 310.

The steering wheel 320 may be rotatable in a certain direction corresponding to an operation of the driver, and the front vehicle wheel or the rear vehicle wheel of the vehicle 1 may be rotated corresponding to the rotation direction of the steering wheel 320 so that the vehicle 1 is steered. In the steering wheel 320, a spoke 321 connected to a rotational shift and a handle wheel 322 coupled to the spoke 321 may be provided. In the spoke 321, an input device may be installed for inputting a variety of commands, and the input device may be implemented using a physical button, a knob, a touch pad, a touch screen, a stick-type operator, or a track ball. The handle wheel 322 may have a circular shape for the convenience of the driver, but is not limited thereto. A vibrator 201 (refer to FIG. 4) may be provided inside at least one of the spoke 321 and the handle wheel 322 and then the at least one of the spoke 321 and the handle wheel 322 may be vibrated with a certain intensity under an external control. In one form, the vibrator 201 may be vibrated with various intensities in response to an external control signal, and thus the at least one of the spoke 321 and the handle wheel 322 may be vibrated with various intensities in response to the external control signal. The vehicle 1 may provide a haptic warning to the driver by using the vibrator 201. For example, the at least one of the spoke 321 and the handle wheel 322 may be vibrated with an intensity corresponding to a risk, which is determined when the vehicle 1 changes its lane, so as to provide a variety of warnings to the driver. Particularly, as the risk is higher, the at least one of the spoke 321 and the handle wheel 322 may be strongly vibrated so as to provide a high level warning to the driver.

In the rear side of the steering wheel 320, a turn signal indicator input 318f may be provided. A user may input a signal to change a driving direction or a lane via the turn signal indicator input 318f during driving the vehicle 1.

The instrument panel 330 may be configured to provide a variety of information related to the vehicle to the driver, wherein the variety of information may include a speed of the vehicle 1, an engine speed, fuel residual amount, a temperature of engine oil or whether the turn signal indicator is flashed or not. The instrument panel 330 may be implemented using an illumination lamp or a scale plate or may be implemented using a display panel. When the instrument panel 330 is implemented using the display panel, the instrument panel 330 may display more various information, e.g., fuel consumption, whether various devices mounted on the vehicle 1 are performed or not, as well as the above mentioned information, for the driver. In one form, the instrument panel 330 may output a different warning to the driver according to the risk of the vehicle 1. Particularly, the instrument panel 330 may provide a different warning to the driver according to the identified risk when the vehicle 1 changes a lane.

Referring to FIG. 4, the vehicle 1 may include a storage 90 storing data related to the control of the vehicle 1, a controller 100 controlling each components of the vehicle 1, and a communicator 150 transmitting and receiving data between the vehicle 1 and other vehicle.

The controller 100 may recognize an object based on a result of detecting the object in the vicinity of the vehicle 1, wherein the object is imaged by the imager 350, and receive position and speed information of the object obtained by the sensor 200.

The controller 100 may calculate a TTC between the vehicle 1 and the object. When the vehicle 1 is in a parked state or stopped state, the controller 100 may calculate a TTC between other vehicle driving in the vicinity of the vehicle 1 and the object.

When the controller 100 identifies that the collision risk is present between other vehicle driving in the vicinity of the vehicle 1 and the object, the controller 100 may generate a control signal controlling a driving speed of the other vehicle or a control signal braking the other vehicle. In addition, the controller 100 may generate a control signal altering a driver of the other vehicle corresponding to a target vehicle, to the collision risk between the other vehicle and the object.

The storage 90 may store various data related to the control of the vehicle 1. Particularly, in one form, the storage 90 may store information related to a driving speed, a driving distance, and a driving time of the vehicle 1 and the storage 90 may store the type and position information of the object detected by the imager 350.

The storage 90 may store position information and speed information of the object detected by the sensor 200 and may store coordinates information of the moving object that is changed in real time. The storage 90 may store information related to the relative distance and the relative speed between the vehicle 1 and the object.

The storage 90 may store position information and speed information of other vehicle in the vicinity of the vehicle 1, wherein the vehicle in the vicinity of the vehicle 1 is detected by the sensor 200, and the storage 90 may store coordinates information of the other, which drives in vicinity of the vehicle 1, wherein the coordinate information is changed in real time.

The storage 90 may store information related to the relative distance and the relative speed between the object and the other vehicle driving in vicinity of the vehicle 1.

In addition, the storage 90 may store data related to equations and control algorithms for controlling the vehicle 1, and the controller 100 may transmit a control signal controlling the vehicle 1 in accordance with this equations and control algorithm.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the storage is not limited thereto. The storage 90 may be a memory that is implemented by a separate memory chip from the aforementioned processor related to the controller 100 or the storage may be implemented by a single chip with a processor.

The communicator 150 may transmit and receive data related to the control of the vehicle 1. Particularly, the communicator 150 may transmit a control signal generated from the controller 100 to other vehicle located around the vehicle 1, and may receive the control signal transmitted from the other vehicle.

The communicator 150 may include at least one of Bluetooth communication module communicating with other vehicle by using one to one communication method or many to one communication method, wireless fidelity (WiFi) communication module connected to the local area network by using an access point device, and near field communication module such as Zigbee communication module generating the local area communication network with other vehicle. However, the communication module included in the communicator 150 is not limited to the Bluetooth communication module, the Wi-Fi communication module, and the short-range communication module, and may include a communication module that performs communication according to various communication protocols.

Figure 5:
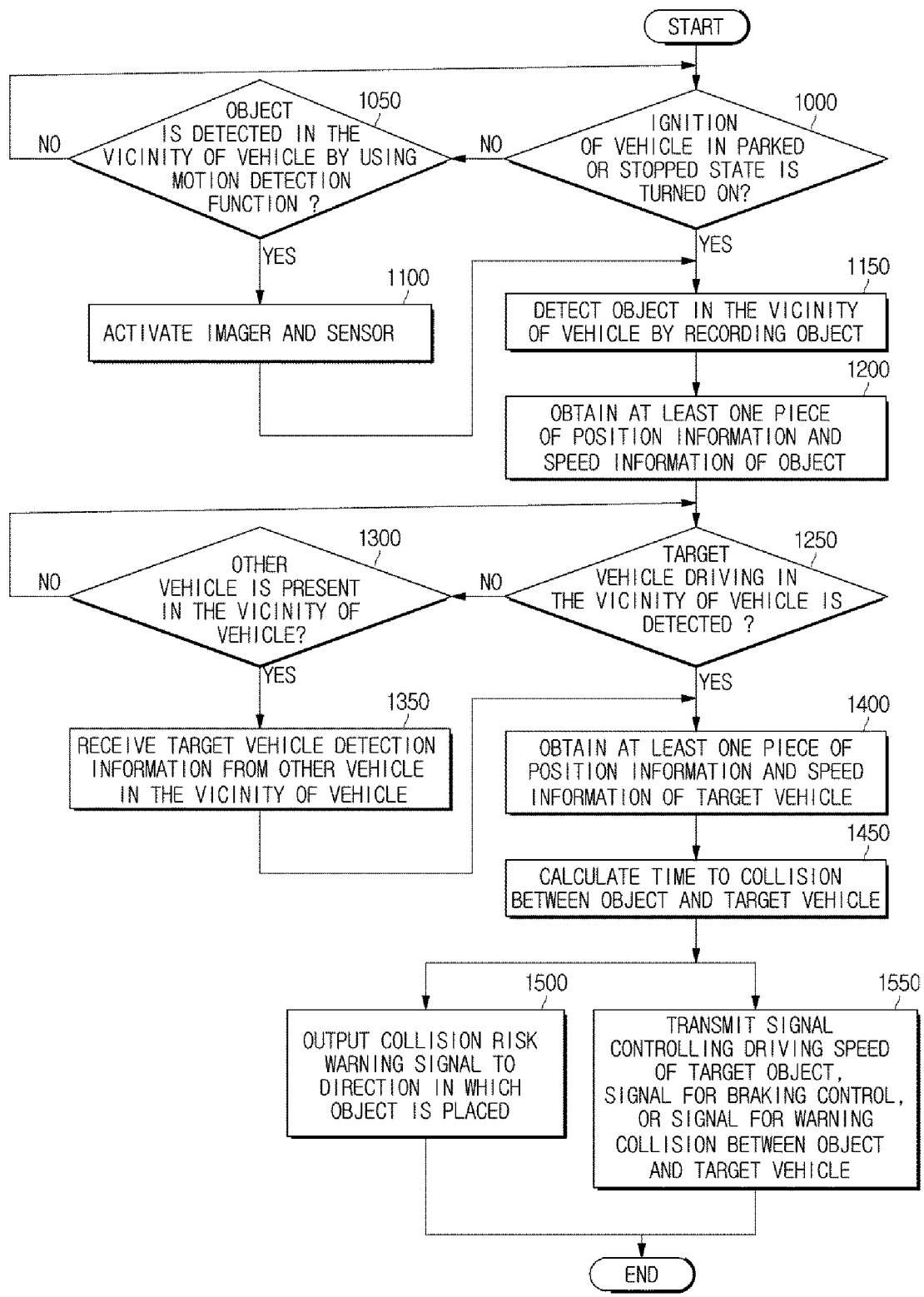
FIG. 5 is a flowchart illustrating a method for controlling a vehicle.

FIG. 5 is a flowchart illustrating a method for controlling a vehicle in one form. FIGS. 6 to 9 are views illustrating a method for controlling a vehicle for preventing a collision between an object that is detected by a parked or stopped vehicle and other vehicle driving in the vicinity of the vehicle in another form. FIGS. 10 to 11 are views illustrating a method for controlling a vehicle for preventing a collision between an object and other vehicle driving in the vicinity of the vehicle by using a communication between a parked or stopped vehicle and a plurality of other vehicles in other form. FIG. 12 is a view illustrating a method for controlling a vehicle for preventing a collision between an object that is detected by a parked or stopped vehicle and other vehicle driving in the vicinity of the vehicle in another form.

Hereinafter, a method for controlling a vehicle in one form disclosed in FIGS. 6 to 12 will be described with reference to the flowchart of FIG. 5.

The method for controlling the vehicle may be applied to both of a case in which the vehicle 1 is parked or stopped and applied to a case in which the vehicle 1 drives. Hereinafter, a case in which the vehicle 1 is stopped will be described as an example.

There is no limitation on the type of the object described in the form, but a case in which the object is a 'pedestrian' will be described below as an example. Further, in the following description, it is assumed that "other vehicle driving in the vicinity of the vehicle 1" is "target vehicle".

Figure 6:
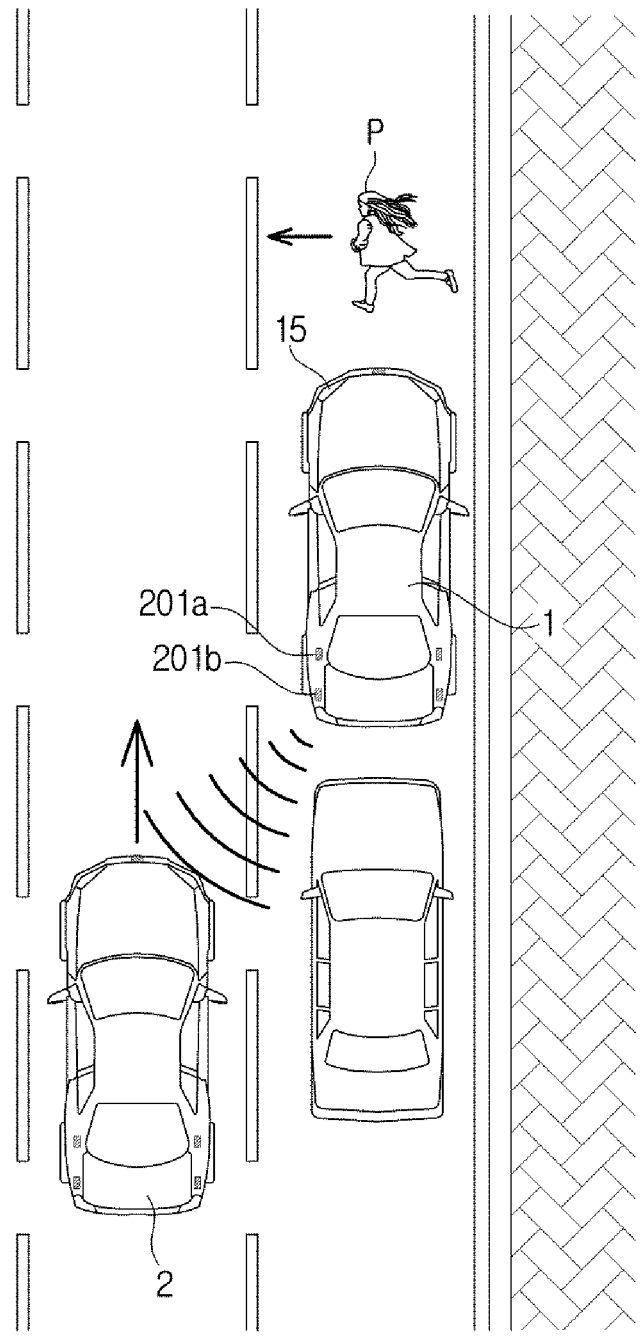
FIGS. 6 to 9 are views illustrating a method for controlling a vehicle for inhibiting a collision between an object that is detected by a parked or stopped vehicle and other vehicle driving in the vicinity of the vehicle.

As shown in FIG. 6, when a pedestrian P is walking on the road, the vehicle 1 parked or stopped on the road hides the pedestrian P and thus it may be difficult for a target vehicle 2 in a driving state to immediately perform a collision avoidance control about the pedestrian P.

Therefore, the vehicle 1 may detect the movement of the pedestrian P and the target vehicle 2 and calculate a time to collision (TTC) between the pedestrian P and the target vehicle 2. Accordingly, the vehicle 1 may output a collision risk warning signal to the pedestrian P and transmit a control signal, which is configured to control a driving speed of the target vehicle or to perform braking of the target vehicle 2, thereby inhibiting or preventing the collision.

The controller 100 may identify whether an ignition of the vehicle 1 in a parked or stopped state is turned on or off (1000).

When the ignition of the vehicle 1 is turned on, the imager 350 and the sensor 200 may be activated and thus the imager 350 and the sensor 200 may detect the pedestrian P in the vicinity of the vehicle 1 and the target vehicle 2 in the driving state. However, when the ignition of the vehicle 1 is turned off, the imager 350 and the sensor 200 may be not activated and thus the controller 100 may need to activate the imager 350 and the sensor 200 so as to identify the pedestrian P and the target vehicle 2.

The controller 100 may identify whether the imager 350 detects an object in the vicinity of the vehicle 1 by using a motion detection function (1050), and when the object is detected, the controller 100 may activate the imager 350 and the sensor 200 although the ignition of the vehicle 1 is turned off (1100).

The controller 100 may activate the imager 350 and the sensor 200 even when the object in the vicinity of the vehicle 1 is detected by the sensor 200 in a low power mode.

The imager 350 may record the pedestrian P around the vehicle 1 to detect the pedestrian P walking on the road (1150)

The sensor 200 may obtain at least one piece of position information and speed information of the walking pedestrian P (1200). As illustrated in FIG. 2, the first sensor 200a to the third sensor 200c may detect the pedestrian P in front of the vehicle 1 and obtain at least one piece of the position information and the speed information of the pedestrian P.

Particularly, during the pedestrian P is walking, the imager 350 may record an image of the pedestrian P in real time and detect the pedestrian P, and the sensor 200 may obtain coordinate information of the pedestrian P that is changed in real time, and deliver the coordinate information to the controller 100.

The controller 100 may calculate a moving speed of the pedestrian P based on the coordinate information of the pedestrian P that is changed and estimate a moving path of the pedestrian P based on the moving speed and moving direction of the pedestrian P.

The controller 100 may identify whether the target vehicle 2 driving in the vicinity of the vehicle 1 is detected by the sensor 200 provided in the vehicle 1 (1250).

That is, the rear lateral side sensor 201 provided on the vehicle 1 may detect other vehicle approaching from the rear or the rear lateral side of the vehicle 1 and the controller 100 may identify the collision risk between the approaching other vehicle and the pedestrian P.

As illustrated in FIG. 6, the first rear lateral side sensor 201a or the second rear lateral side sensor 201b provided on the left side of the vehicle 1 may detect the target vehicle 2 approaching from the rear left side of the vehicle 1.

When detecting the target vehicle 2 driving in the vicinity of the vehicle 1, the sensor 200 may obtain at least one piece of position information and speed information of the target vehicle 2 (1400).

The controller 100 may calculate a TTC between the pedestrian P and the target vehicle 2 based on at least one piece of the position information and the speed information of the pedestrian P and at least one piece of the position information and speed information of the target vehicle 2 (1450).

That is, as illustrated in FIG. 6, when the walking pedestrian P is covered with the parked or stopped vehicle 1, the vehicle 1 may identify the collision risk between the pedestrian P and the target vehicle 2.

The controller 100 may transmit a control signal so that a collision risk warning signal is output to a direction in which the pedestrian P is placed, based on the TTC between the pedestrian P and the target vehicle 2 (1500).

Figure 7:
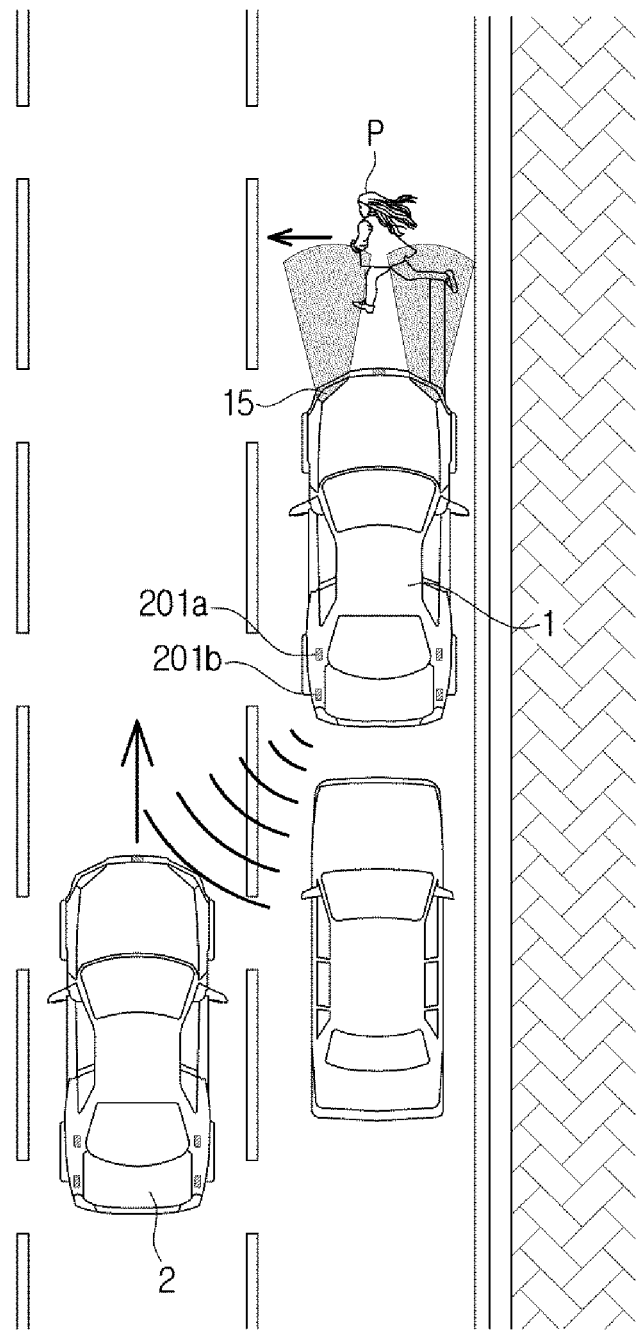

Referring to FIG. 7, the controller 100 may transmit a control signal warning of the collision risk to allow the headlamp 15 of the vehicle 1 to emit light to a direction in which the pedestrian P is placed. That is, when it is detected that the target vehicle 2 drives in the vicinity of the vehicle 1 the controller 100 may control the light emitted from the headlamp 15 to alert the pedestrian P to the collision risk, and thus the headlamp 15 may emit light to the pedestrian P under the control of the controller 100 to allow the pedestrian P to recognize the collision risk.

The brightness or the irradiation time of the light irradiated from the headlamp 15 in response to the control signal transmitted by the controller 100 may vary according to the setting. Data related thereto may be pre-stored in the storage 90.

Figure 8:
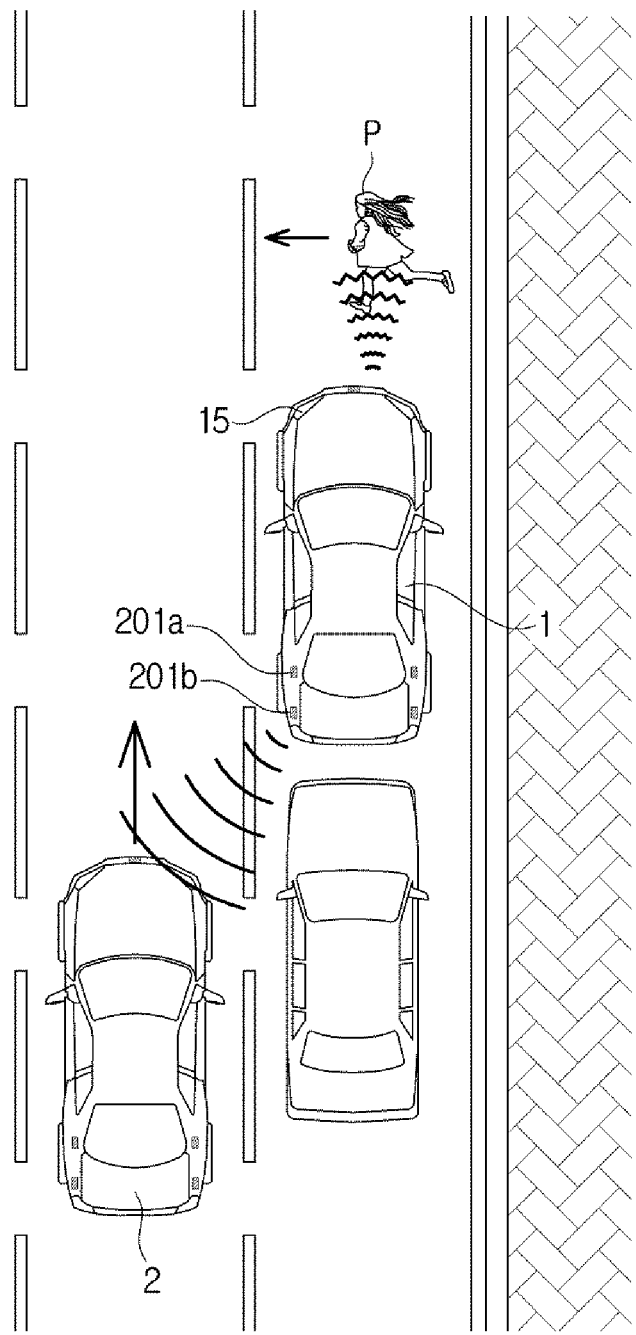

Referring to FIG. 8, the controller 100 may transmit a control signal warning of the collision risk by outputting a sound signal of the vehicle 1 to a direction in which the pedestrian P is placed. That is, when it is detected that the target vehicle 2 drives in the vicinity of the vehicle 1, the controller 100 may transmit the control signal so that a speaker (not shown), which is provided in the vehicle 1, outputs a warning sound to alert the pedestrian P to the collision risk.

Although not shown in the drawing, the speaker provided in the vehicle 1 may be implemented in the form of a speaker array. By outputting a warning sound toward the pedestrian P under the control of the controller 100, it may be possible to allow the pedestrian P to recognize the collision risk.

The intensity or the output time of the warning sound, which is output from the vehicle 1 in response to the control signal transmitted by the controller 100, may vary according to the setting, and the type of the warning sound may be implemented in various manners.

That is, the controller 100 of the vehicle 1 may identify the collision risk between the pedestrian P and the target vehicle 2 driving in the vicinity of the vehicle 1 and directly output a collision risk warning signal to the pedestrian P thereby allowing the pedestrian P to recognize the collision risk, wherein the pedestrian P is placed in the blind spot and thus a driver of the target vehicle 2 does not recognize the pedestrian P.

Figure 9:
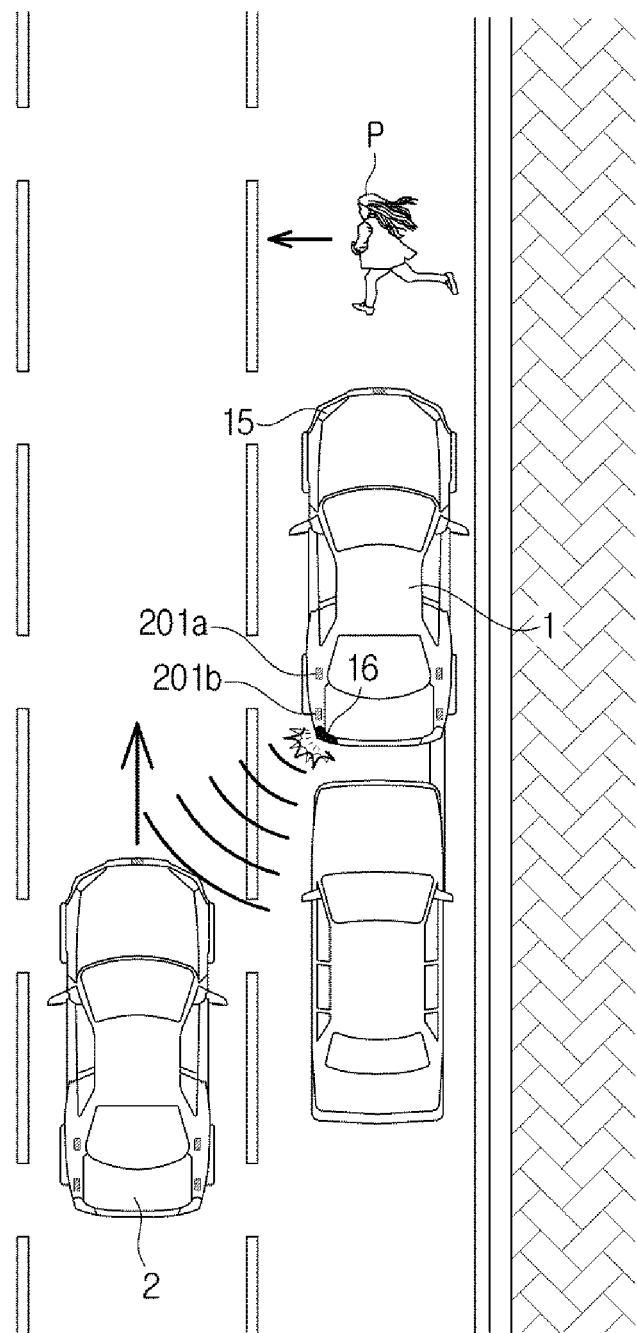

Referring to FIG. 9, by allowing the turn signal lamp 16 provided in the rear of the vehicle 1 to be flashed, the controller 100 may alert the driver of the target vehicle 2, which drives in the vicinity of the vehicle 1, to the collision risk with the obstacle on the driving route of the target vehicle 2.

As illustrated in FIG. 9, when the target vehicle 2 is approaching from the rear left side of the vehicle 1, the controller 100 may operate the turn signal lamp 16 provided on the rear left side of the vehicle 1, and thus the driver of the target vehicle 2 may recognize the turn signal lamp 16 that is flashed.

A flashing time and the number of flashing of the turn signal lamp 16, which is operated under the control of the controller 100, may vary according to the setting.

Referring to FIG. 6 again, the controller 100 may transmit a signal controlling the driving speed of the target vehicle 2 based on the TTC between the pedestrian P and the target vehicle 2 (1550).

That is, the controller 100 may generate a control signal decelerating the driving speed so as to avoid the collision with the pedestrian P based on the TTC. The control signal generated by the controller 100 may be transmitted to the target vehicle 2 through the communicator 150, and the target vehicle 2 may receive the control signal and regulate the driving speed of the target vehicle 2.

The controller 100 may transmit a braking control signal to avoid the collision between the target vehicle 2 and the object based on the TTC between the pedestrian P and the target vehicle 2 (1550).

That is, the controller 100 may generate a signal performing the braking control so that the target vehicle 2 does not collide with the pedestrian P based on the calculated TTC, and the control signal generated by the controller 100 may be transmitted to the target vehicle 2 through the communicator 150. The target vehicle 2 may receive the control signal and perform the braking control on the collision with the pedestrian P.

That the target vehicle 2 performs the braking control on the pedestrian P in response to the braking control signal generated by the controller 100 may be implemented in the same manner as the braking control of the general vehicle 1, and thus a detail description thereof will be omitted.

The controller 100 may transmit the control signal warning the driver of the target vehicle 2 of the risk of collision between the pedestrian P and the target vehicle 2 based on the TTC between the pedestrian P and the target vehicle 2 (1550).

That is, the control signal generated by the controller 100 may be transmitted to the target vehicle 2 through the communicator 150, and based on the received control signal, the target vehicle 2 may provide the collision risk warning to the driver of the target vehicle 2 in a visual or auditory manner, on the display provided in the target vehicle 2.

The driver of the target vehicle 2 may confirm a collision warning message displayed on the display of the target vehicle 2 or listen to a collision warning signal output through the speaker provided in the target vehicle 2. Therefore, the driver of the target vehicle 2 may recognize the collision risk between the target vehicle 2 and the pedestrian P so as to perform the collision avoidance control.

Referring to FIG. 5 again, when the sensor 200 of the vehicle 1 does not detect the target vehicle 2 driving in the vicinity of the vehicle 1, the controller 100 may identify whether other vehicles 3 and 4 are present in the vicinity of the vehicle 1 (1300).

When other vehicles 3 and 4 are present in the vicinity of the vehicle 1, the controller 100 may receive information about the target vehicle 2 detected by the other vehicles 3 and 4 (1350).

As illustrated in FIG. 10, when the vehicle 1 does not directly detect the target vehicle 2 since the other vehicles 3 and 4 wafting a traffic signal are placed in the vicinity of the vehicle 1, the vehicle 1 may receive at least one piece of the position information and the speed information of the target vehicle 2 detected by the other vehicles 3 and 4 through the communicator 150.

The other vehicles 3 and 4 around the vehicle 1 may detect the driving target vehicle 2 through the sensor, and transmit the position information and the speed information of the target vehicle 2 to the vehicle 1 through the short range communication network.

The vehicle 1 may calculate a TTC between the target vehicle 2 and the pedestrian P based on the position information and the speed information of the target vehicle 2 transmitted from the other vehicles 3 and 4, and based on the calculated TTC, the vehicle 1 may transmit a control signal so that a collision risk warning signal is output to a direction in which the pedestrian P is placed.

In addition, the controller 100 may transmit a signal controlling the driving speed of the target vehicle 2 based on the TTC between the target vehicle 2 and the pedestrian P, and deliver the signal to the other vehicles 3 and 4 in the vicinity of the vehicle 1, through the communicator 150. The other vehicles 3 and 4 may receive the signal controlling the driving speed of the target vehicle 2 from the vehicle 1 and deliver the signal to the target vehicle 2. Accordingly, the target vehicle 2 may avoid the collision with the pedestrian P by reducing the driving speed.

In addition, the controller 100 may transmit a braking control signal allowing the target vehicle 2 to avoid the collision between the target vehicle 2 and the pedestrian P, based on the TTC between the target vehicle 2 and the pedestrian P, and deliver the signal to the other vehicles 3 and 4 in the vicinity of the vehicle 1, through the communicator 150. The other vehicles 3 and 4 may receive the braking control signal of the target vehicle 2 from the vehicle 1 and deliver the signal to the target vehicle 2. Accordingly, the target vehicle 2 may perform the braking control about the collision with the pedestrian P by receiving the control signal.

In addition, the vehicle 1 may transmit the control signal warning the driver of the target vehicle 2 of the collision risk between the target vehicle 2 and the pedestrian P, based on the TTC between the target vehicle 2 and the pedestrian P, and the vehicle 1 deliver the transmitted control signal to the other vehicles 3 and 4 in the vicinity of the vehicle 1, through the communicator 150. The other vehicles 3 and 4 may receive the control signal transmitted from the vehicle 1, and deliver the control signal to the target vehicle 2. In response to the received control signal, the target vehicle 2 may provide the collision risk warning to the driver of the target vehicle 2 in a visual or auditory manner, on the display provided in the target vehicle 2.

Referring to FIG. 11, the vehicle 1 may not directly detect the target vehicle 2 since other vehicles 3 and 4 are placed in the rear side of the vehicle 1 and the driving target vehicle 2 is not in vicinity of the vehicle 1. In this case, the vehicle 1 may receive at least one piece of the position information and the speed information of the target vehicle 2 detected by the other vehicles 5 and 6, through the communicator 150.

As illustrated in FIG. 11, the other vehicles 5 and 6 in the rear side of the vehicle 1 may detect the driving target vehicle 2 through the sensor, and transmit the position information and the speed information of the target vehicle 2 to the vehicle 1 through the short range communication network.

The vehicle 1 may calculate a TTC between the target vehicle 2 and the pedestrian P based on the position information and the speed information of the target vehicle 2 transmitted from the other vehicles 5 and 6, and based on the calculated TTC, the vehicle 1 may transmit a control signal so that a collision risk warning signal is output to a direction in which the pedestrian P is placed.

In addition, based on the TTC between the target vehicle 2 and the pedestrian P, the controller 100 may transmit at least one of a signal controlling the driving speed of the target vehicle 2, a braking control signal of the target vehicle 2, and a control signal warning the driver of the target vehicle 2 of the collision between the target vehicle 2 and the pedestrian P. A description thereof is the same as the above mentioned description in FIG. 10 and thus it will be omitted.

As illustrated in FIG. 12, the third rear lateral side sensor 201c or the fourth rear lateral side sensor 201d provided on the right side of the vehicle 1 may detect the target vehicle 2 approaching from the rear right side of the vehicle 1.

The controller 100 may calculate a time to collision (TTC) between the pedestrian P and the target vehicle 2 based on at least one piece of the position information and the speed information of the pedestrian P that is obtained by the sensor 200 and at least one piece of the position information and speed information of the target vehicle 2.

That is, as illustrated in FIG. 12, when the walking pedestrian P is covered with the parked or stopped vehicle 1, the vehicle 1 may identify the collision risk between the pedestrian P and the target vehicle 2, wherein the target vehicle 2 drives to turn right side.

The controller 100 may transmit a control signal so that a collision risk warning signal is output to a direction in which the pedestrian P is placed, based on the TTC between the pedestrian P and the target vehicle 2.

In addition, based on the TTC between the target vehicle 2 and the pedestrian P, the vehicle 1 may transmit at least one of a signal controlling the driving speed of the target vehicle 2, a braking control signal of the target vehicle 2, and a control signal warning the driver of the target vehicle 2 of the collision between the target vehicle 2 and the pedestrian P. A description thereof is the same as the above mentioned description in FIG. 6 and thus it will be omitted.

As is apparent from the above description, the vehicle in a parked or stopped state may detect an object in the blind spot of the road and directly warn the object so as to prevent the collision between other vehicle approaching from the rear side and the object in the blind spot. In addition, by outputting a control signal to other vehicle in the vicinity of the vehicle, the vehicle may effectively control the other vehicle in a driving state, according to the collision risk between the driving other vehicle and the object or according to the collision expected condition.

Meanwhile, the disclosed forms may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few forms of the present disclosure have been shown and described, it would be appreciated by those skilled in the art that changes may be made in these forms without departing from the principles and spirit of the disclosure.

DESCRIPTION OF SYMBOLS

1: vehicle
2: pedestrian
15: head lamp
16: turn signal lamp
90: storage
100: controller
200: sensor
350: imager

What is claimed is:

1. A vehicle comprising:
an imager configured to detect an object in the vicinity of the vehicle;
a sensor configured to obtain at least one of position information or speed information of the object detected by the imager; and
a controller configured to:
when the imager is detecting the object using a motion detection function, determine whether the vehicle is in at least one of a parked state, a stopped state, or an ignition off state,
when the vehicle is in the ignition off state, activate the sensor,
calculate a time to collision (TTC) between a target vehicle driving in the vicinity of the vehicle and the object, based on the obtained position information or speed information of the object, and
output a collision risk warning signal in a direction of the object, based on the calculated TTC.

2. The vehicle of claim 1, wherein the controller is further configured to transmit a driving speed control signal configured to cause a driving speed of the target vehicle to be controlled based on the calculated TTC.

3. The vehicle of claim 1, wherein the controller is further configured to transmit, based on the calculated TTC, a braking control signal configured to assist the target vehicle to avoid a collision with the object.

4. The vehicle of claim 1, wherein the controller is further configured to transmit, based on the calculated TTC, a target vehicle driver warning control signal configured to cause the target vehicle to output a warning to a driver of the target vehicle of the collision risk between the target vehicle and the object.

5. The vehicle of claim 1, wherein the sensor is further configured to obtain at least one of position information or speed information of the target vehicle.

6. The vehicle of claim 1, wherein the controller is further configured to generate the collision risk warning signal that is configured to cause a headlamp of the vehicle to emit light in the direction of the object.

7. The vehicle of claim 1, wherein the controller is further configured to generate the collision risk warning signal that is configured to cause a speaker of the vehicle to output a sound signal regarding the target vehicle in the direction of the object.

8. The vehicle of claim 1, wherein the controller is further configured to generate the collision risk warning signal that is configured to cause the operation of a turn signal lamp of the vehicle such that a driver of the target vehicle is warned of a collision risk between the object and the target vehicle.

9. The vehicle of claim 1, wherein the controller is further configured to control a communicator to transmit the collision risk warning signal to the target vehicle.

10. The vehicle of claim 1, wherein the sensor comprises at least one of a Radar sensor or a Light Detection And Ranging (LiDAR) sensor.

11. A control method of a vehicle comprising:
determining, by a controller, whether the vehicle is in at least one of a parked state, a stopped state, or an ignition off state when an imager is detecting an object using a motion detection function;
when the vehicle is in the ignition off state, activating, by the controller, a sensor;
detecting, by the imager, an object by recording the object in the vicinity of the vehicle;
obtaining, by the sensor, at least one of position information or speed information of the object;
calculating, by the controller, a time to collision (TTC) between a target vehicle driving in the vicinity of the vehicle and the object, based on the obtained position information or speed information of the object; and
transmitting, by the controller, a collision risk warning signal in a direction of the object, based on the calculated TTC.

12. The control method of claim 11, further comprising:
transmitting, by the controller, a driving speed control signal configured to cause a driving speed of the target vehicle to be controlled, based on the calculated TTC.

13. The control method of claim 11, further comprising:
transmitting, by the controller, a braking control signal to the target vehicle so as to avoid a collision between the target vehicle and the object, based on the calculated TTC.

14. The control method of claim 11, further comprising:
transmitting, by the controller, a target vehicle driver warning control signal configured to cause the target vehicle to output a warning to a driver of the target vehicle of a collision risk between the target vehicle and the object, based on the calculated TTC.

15. The control method of claim 11, further comprising:
obtaining, by the sensor, at least one position information or speed information of the target vehicle driving in the vicinity of the vehicle.

16. The control method of claim 11, wherein the collision risk warning signal comprises a control signal warning of a collision risk, and the control signal is configured to cause a headlamp of the vehicle to emit light in the direction of the object.

17. The control method of claim 11, wherein the collision risk warning signal comprises a control signal to warn of a collision risk, and the control signal is configured to cause a speaker of the vehicle to output a sound signal from the vehicle in the direction of the object.

18. The control method of claim 11, wherein the collision risk warning signal comprises a control signal to warn a driver of the target vehicle of a collision risk between the object and the target vehicle, and the control signal is configured to cause the operation of a turn signal lamp of the vehicle.

19. The control method of claim 11, further comprising:
transmitting the collision risk warning signal to the target vehicle.

* * * * *